US011095246B1

(12) United States Patent
Caiafa et al.

(10) Patent No.: US 11,095,246 B1
(45) Date of Patent: Aug. 17, 2021

(54) REDUNDANT ELECTRIC MOTOR DRIVE

(71) Applicant: General Electric Company, Schenectady, NY (US)

(72) Inventors: Antonio Caiafa, Schenectady, NY (US); Di Pan, Niskayuna, NY (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 16/789,640

(22) Filed: Feb. 13, 2020

(51) Int. Cl.
*H02P 29/028* (2016.01)
*H02P 29/50* (2016.01)
*H02P 27/08* (2006.01)
*H02P 25/22* (2006.01)

(52) U.S. Cl.
CPC ............ *H02P 29/028* (2013.01); *H02P 25/22* (2013.01); *H02P 27/08* (2013.01); *H02P 29/50* (2016.02)

(58) Field of Classification Search
USPC ........................................................ 318/560
See application file for complete search history.

(56) References Cited

U.S. PATENT DOCUMENTS

| | | | | |
|---|---|---|---|---|
| 4,380,723 A * | 4/1983 | Leis | ........................ | G01P 3/489 388/811 |
| 5,319,572 A * | 6/1994 | Wilhelm | ............ | G05B 23/0235 702/51 |
| 5,416,390 A * | 5/1995 | Choi | .................. | G11B 15/6653 318/434 |
| 6,215,263 B1 * | 4/2001 | Berkowitz | ............. | H02H 7/222 318/272 |
| 7,064,526 B2 | 6/2006 | Patterson | | |
| 9,647,455 B2 | 5/2017 | Gao et al. | | |
| 9,885,289 B2 | 2/2018 | Rechain et al. | | |
| 10,027,112 B2 | 7/2018 | Krstic | | |
| 10,205,379 B2 | 2/2019 | Caiafa | | |
| 2005/0218853 A1 * | 10/2005 | Kokami | ................. | G05B 11/28 318/599 |
| 2006/0284498 A1 * | 12/2006 | Piper | ...................... | H02K 11/33 310/63 |
| 2010/0117578 A1 * | 5/2010 | Hollenbeck | ........... | E05F 15/668 318/461 |

(Continued)

OTHER PUBLICATIONS

Bojoi et al. "Analysis and Survey of Multi-Phase Power Electronic Converter Topologies for the More Electric Aircraft Applications" International Symposium on Power Electronics, Electrical Drives, Automation and Motion; 2012 (5 pages).

(Continued)

*Primary Examiner* — Bentsu Ro
(74) *Attorney, Agent, or Firm* — Dority & Manning, P.A.

(57) ABSTRACT

A system may be provided that may include an integrated motor drive configured to couple to a motor. The integrated motor drive may include a first converter that may be configured to electrically couple with a winding assembly of the motor. The first converter may include at least first conversion circuitry configured to form a first electrical excitation waveform and second conversion circuitry coupled in parallel to the second conversion circuitry and configured to form a second electrical excitation waveform. The first converter may also include a first transformer configured to form a first summation electrical excitation waveform from the first electrical excitation waveform and the second electrical excitation waveform that drives the motor.

20 Claims, 9 Drawing Sheets

(56) References Cited

U.S. PATENT DOCUMENTS

2013/0343089 A1   12/2013  Gupta et al.
2018/0323712 A1   11/2018  Traube
2018/0372588 A1   12/2018  Hon et al.

OTHER PUBLICATIONS

Zhang "On Electric Machinery for Integrated Motor Drives in Automotive Applications" KTH Electrical Engineering; 2017 (74 pages).
Abebe et al. "Integragted Motor Drives: State of the Art and Future Trends" IET Electric Power Applications; 2016 (15 pages).
Lillo et al. Multiphase Power Converter Drive for Fault-Toldeant Machine Development in Aerospace Applications; 2009 (9 pages).

* cited by examiner

REDUNDANT ELECTRIC MOTOR DRIVE

FIELD

The subject matter described herein relates to a redundant integrated motor drive.

BACKGROUND

Electric motor/generators for vehicles such as aircraft typically operate at high voltages that have a pulse width modulation (PWM) voltage waveforms that can generate significant ripple voltage. As a result of the high voltage overshoot, significant amounts of insulation are often utilized to provide protection and absorb heat generated from the electric motor/generator. When the vehicle operates as high altitudes, such as when the vehicle is an aircraft, these concerns are even more pronounced.

Additionally, low reliability of electric motor/generators may be problematic for some vehicles, such as aircraft, because a fault in one portion of the circuitry of a motor/generator drive can result in the failure of the entire motor/generator. While back-up motors can be provided, motors that can still operate, even with faults is more desirable for these types of applications.

BRIEF DESCRIPTION

In one or more embodiments, a system may be provided that may include an integrated motor drive configured to couple to a motor. The integrated motor drive may include a first converter that may be configured to electrically couple with a winding assembly of the motor. The first converter may include at least first conversion circuitry configured to form a first electrical excitation waveform and second conversion circuitry coupled in parallel to the second conversion circuitry and configured to form a second electrical excitation waveform. The first converter may also include a first transformer configured to form a first summation electrical excitation waveform from the first electrical excitation waveform and the second electrical excitation waveform that drives the motor.

In one or more embodiments, a system may be provided that may include an integrated motor drive configured to couple to a motor. The motor drive may include a first converter that may be configured to electrically couple with a winding assembly of the motor. The first converter may include at least conversion circuitry that may be configured to form a first electrical excitation waveform to drive the motor, and may also include a second converter configured to electrically couple with the winding assembly of the motor. The second converter may include at least conversion circuitry of the second converter configured to form a second electrical excitation waveform to drive the motor independently of the first converter.

In one or more embodiments, method may be provided that may include inputting a direct electrical excitation input from a direct electrical excitation source into first conversion circuitry of a first converter. The first conversion circuitry may be electrically coupled in series with the direct electrical excitation source. The method may also include inputting the direct electrical excitation input from the direct electrical excitation source into second conversion circuitry of the first converter. The first conversion circuitry may be electrically coupled in series with the direct electrical excitation source. The method may also include outputting an electric current that may have a first electrical excitation waveform with a first phase with the first conversion circuitry. The method may also include outputting an electric current that may have a second electrical excitation waveform with a different, second phase with the second conversion circuitry. The method may also include forming a first summation electrical excitation waveform that may include the first electrical excitation waveform and the second electrical excitation waveform to drive the motor.

BRIEF DESCRIPTION OF THE DRAWINGS

The present inventive subject matter will be better understood from reading the following description of non-limiting embodiments, with reference to the attached drawings, wherein below.

DETAILED DESCRIPTION

Provided is an integrated motor drive for a hybrid electric propulsion motor/generator. The drive may be coupled to the electric propulsion motor/generator and include numerous converters for providing an input voltage to the motor. In particular, each converter is coupled to the winding assembly of the electrical motor to provide an electrical excitation input. When used herein, electrical excitation input, output, signals, etc. may include voltage based input, output, signals, etc., or current based input, output, signals, etc. that may allow the sensor to detect the applied current of the battery. Additionally, when a voltage input, output, signal, etc. is discussed, a current input, output, signal, etc. is contemplated and disclosed. Each converter comprises conversion circuits that receive an input electrical excitation signal such as current or voltage from a direct electrical excitation signal source and provide an output electrical excitation for the motor accordingly. Each converter outputs an electrical excitation independent of the other converters. In this manner, the drive has redundancy such that if one converter malfunctions, the other converters may provide input voltage to compensate the loss of the damaged converter and continue to drive the motor until the vehicle reaches a point where maintenance may occur. To this end, voltage from the functioning converters may be increased to prevent or reduce loss of voltage to drive the motor.

In some embodiments, each converter may include plural sets of conversion circuitry that each receive an electrical excitation signal from the direct electrical excitation source and output a portion of an output electrical excitation waveform. The sets of conversion circuitry are then electrically coupled in parallel and/or series to each other and provide output voltage waveforms that have phases that are offset from one another. As a result, the ripple voltage and total harmonic distortion (THD) of the output excitation is greatly reduced, while electromagnetic interference (EMI) is simultaneously reduced. This technique allows to greatly reduce the ripple on the input voltage and currents to the motor as well as to the converter itself. With the slew rate of motor input voltage (dv/dt) greatly reduced, the amount of insulation required similarly may be reduced, saving product costs while reducing manufacturing complexities. The reduced voltage slew rate on the converter input voltage and currents allows also a reduction of EMI hence reducing the amount of electrical shielding required. Additionally, while a trade-off exists by having fewer total converters per motor winding to achieve the reduced ripple, redundant converters may still be presented such that even if a first converter malfunctions, the other converters may be used to provide the input voltage to the motor. As a result, the fault does not result in complete failure of the drive.

Figure 1:
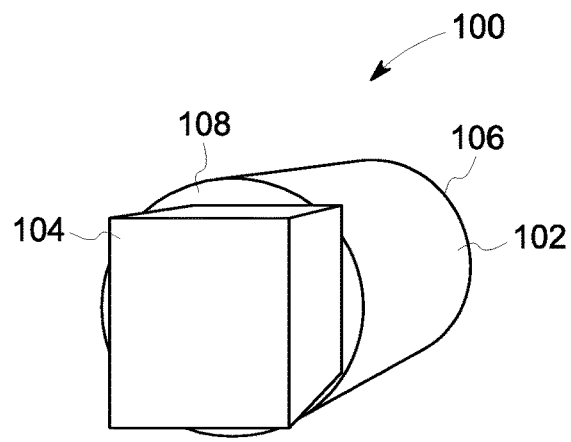
FIG. 1 is a schematic view of an electric motor/generator assembly in accordance with one embodiment.

FIG. 1 illustrates an electric motor/generator assembly 100 for powering a vehicle. In one example, the vehicle may be an aircraft. In other examples, the vehicle may be an over-the-road vehicle, automobile, ship or water bound vehicle, or the like. The electric motor/generator assembly 100 may include an electric motor/generator 102, and an integrated motor drive 104 coupled to the electric motor/generator 102. While the electric motor/generator 104 is understood as a motor/generator, for the purposes of this disclosure, Applicant may refer to the electric motor/generator just as an electric motor to simplify explaining herein. The electric motor 102 may include a drive end 106 and a non-drive end 108, where the drive end includes an output device for performing work. In one example, the output device is an output drive shaft. The electric motor may be configured to receive an input from the motor drive 104 to provide the work of the output device. In one example, the work provided by the output device may be rotation of an output drive shaft. The integrated motor drive 104 may be electrically coupled to the electric motor 102 and mechanically coupled to the electric motor. In one example, fasteners may be used to removably couple the integrated motor drive 104 to the non-output or non-driving end of the motor 102. The integrated motor drive 104 may be coupled to a winding assembly of the electric motor 102 to provide an electrical input for the electric motor 102 to drive the electric motor 102 as described herein.

Figure 2:
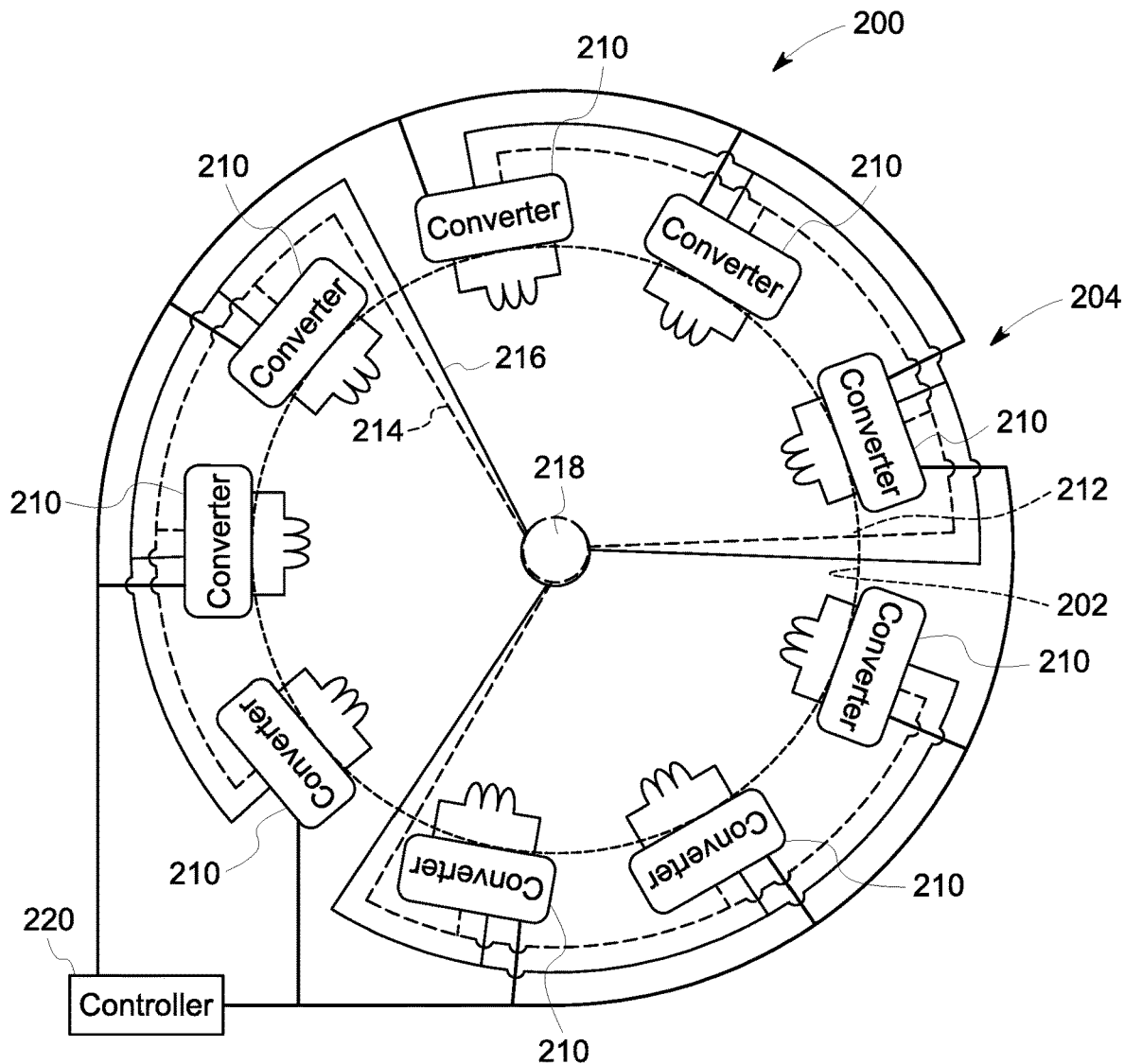
FIG. 2 is a schematic view of a drive for an electric motor/generator assembly in accordance with one embodiment.

FIG. 2 illustrates another example schematic of an electric motor/generator assembly 200 that includes a motor 202 that includes an integrated motor drive 204. The motor 202 is represented by the dashed inner circle, where a rotor (not shown) rotates within the motor 202. The integrated motor drive 204 may include plural converters 210 that surround the periphery 212 of the motor. The plural converters 210 each receive a positive input 214 and the negative input 216 from a centrally located cable 218 disposed therethrough. In one example the cable 218 is a coaxial cable. The positive input 214 and negative input 216 provide a potential difference, or voltage on each converter 210. Each converter independently forms an electrical excitation waveform for the winding assembly of the motor. As used herein, electrical excitation waveform may include both voltage waveforms and current waveforms. As used herein, "independent" and "independently" shall mean without dependency. For example, if a first converter is described as independent of a second converter, or if a first converter is described as operating independently from the second converter, then if a malfunction or fault occurs in one of the converters, the other converter is able to continue to operate and produce an electrical excitation. In this manner, the first converter and second converter are considered redundant to one another, because both may be able to provide an electric excitation input to a motor without the other.

In one example, a controller 220 may be coupled to each converter 210. The controller 220 may include a processor, memory, hardware, software, or the like, and at least one sensor that monitors each converter 210. By monitoring each converter 210, when one converter malfunctions, the controller may detect the malfunction to alert a vehicle operator that maintenance is required. As a result, at the next stop, the malfunctioning converter may be replaced. In addition, the controller 220 may operate the other converters to vary their electrical excitation input to the motor to compensate for the malfunctioning converter. The controller may determine to vary the electrical excitation input of one other converter, a set of converters, all of the additional converters, etc. to reduce the effect of the malfunctioning converter on the performance of the motor. In one example, the controller may include an algorithm that upon determining a fault in a converter, determines the operation of the other remaining converters. In determining the operation of the other converters, the algorithm may consider motor efficiency, converter age, converter usage, converter efficiency, travel time remaining, travel distance remaining, etc. in determining the operation of the remaining functioning converters.

Figure 3:
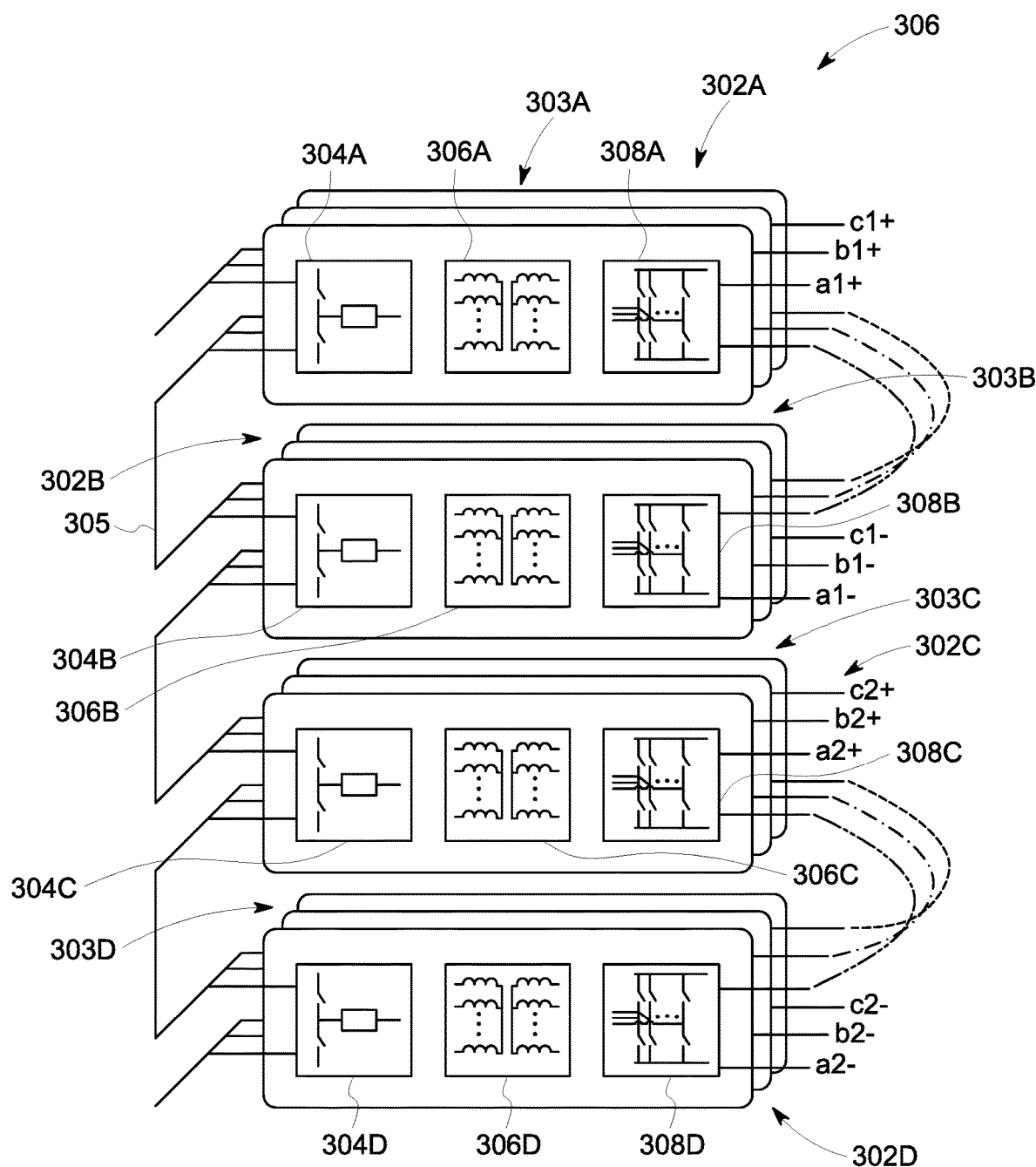
FIG. 3 is a schematic view of a drive for an electric motor/generator in accordance with one embodiment.

FIG. 3 illustrates a schematic diagram of an example motor drive 300 that in one example may be the motor drive of FIGS. 1 and 2. As illustrated, the motor drive 300 comprises plural unit blocks, wherein each unit block represents a converter 302A, 302B, 302C, and 302D. An example converter 302A-D is described in U.S. Pat. No. 10,250,156 entitled Cryogenic Fuel Power System to Caiafa that includes a common inventor, and that disclosure is incorporated by reference in full herein. To this end, U.S. Pat. No. 10,205,379 entitled Multilevel Inverter for Cryogenic Power Systems to the common inventor Caiafa is also incorporated by reference in full herein. While four converters are illustrated in the example embodiment of FIG. 3, more or less converters may be used in other example embodiments. Each converter 302A-D includes conversion circuitry 303A, 303B, 303C, and 303D that includes an input bridge 304A, 304B, 304C, and 304D that receives an electrical input. The electrical input may be a direct electrical excitation input received from a direct electrical excitation source 305 that is coupled in series with each input bridge 304A-D. In one example, the input bridge 304A-D of each converter 302A-D may include switches, capacitors, transistors, MOSFETs, or the like to condition the electrical input. As described, the inputs for each input bridge 304A-D may be connected in series with one another while the input bridges themselves are connected in parallel. As a result, converters 302A-D may each form an electrical excitation waveform.

The conversion circuitry 303A-D of each converter 302A-D may also include a transformer 306A-D that is electrically coupled to the respective input bridge 304A-D. The transformers 306A-D transfer electrical energy without changing frequency when a voltage and current change occurs. Electrically coupled to each transformer 306A-D is a respective output bridge 308A-D. Each output bridge 308A-D may include switches, capacitors, transistors, MOSFETs, etc. to condition the electrical input from each respective transformer 306A-D. In particular, each portion of the waveform formed by each conversion circuitry 303A-D may be combined, or summed, to form a summation waveform from the converter. When used herein, the summation waveform is a waveform formed by a converter from more than one conversion circuitries wherein more than one waveform of the more than one conversion circuitries is added. The summation waveform may then be input into a winding assembly (not shown) of a motor (not shown) to drive the motor accordingly.

Figure 4:
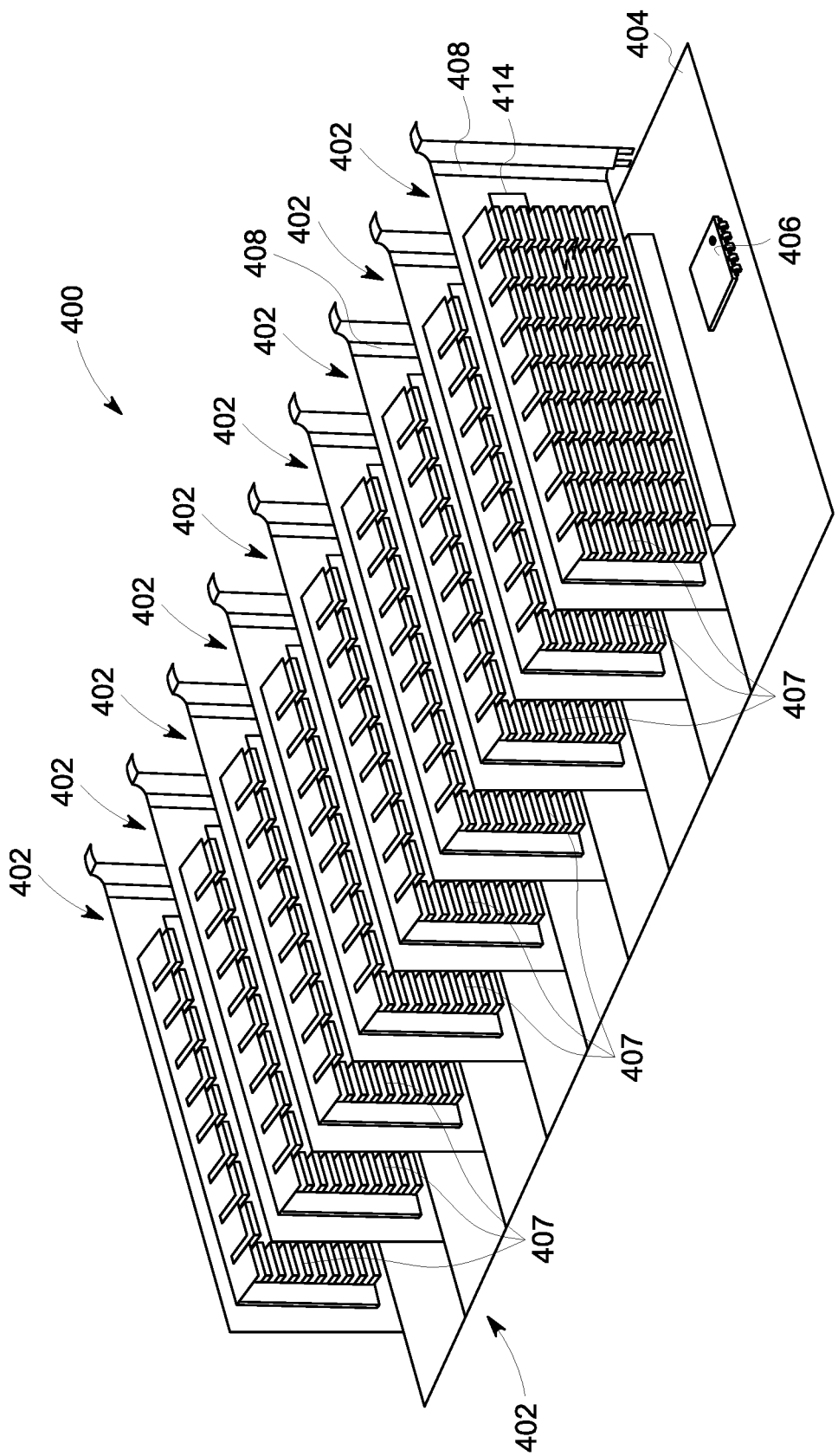
FIG. 4 is a perspective view of a drive for an electric motor/generator in accordance with one embodiment.

FIG. 4 illustrates a perspective view of an example motor drive 400. In one example, the motor drive 400 is one of the motor drives illustrated in FIGS. 1-3. Motor drive 400 includes plural converters 402 that electrically coupled to a primary substrate 404 for electrical coupling to one another. In one example, the primary substrate 404 may be a mother board. The primary substrate 404 may include a primary controller 406 that electrically couples to the plural converters 402 through the primary substrate 404. In one example, the primary controller 406 may be a master controller. In one example, the primary controller 406 may be the controller 220 as described in relation to FIG. 2.

Figure 5A:
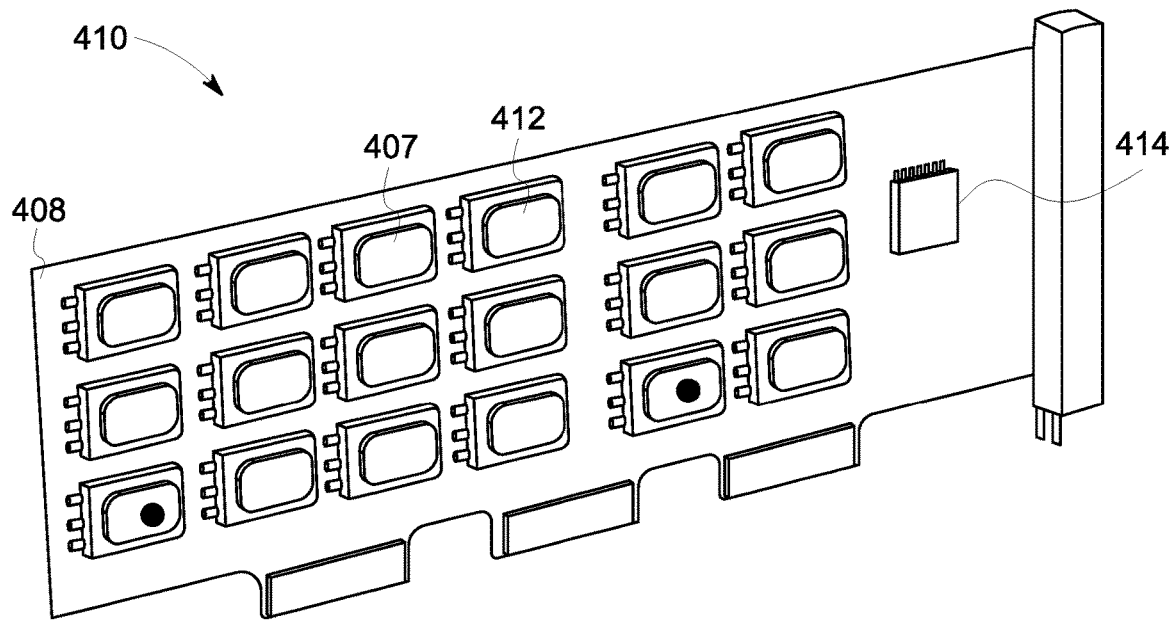
FIG. 5A is a perspective view of a front side of a converter in accordance with one embodiment.

Each converter 402 may include conversion circuitry 407 on a secondary substrate 408 with a first side 410 as illustrated in FIG. 5A. On the first side 410 the conversion circuitry may include plural switching elements 412 that electrically couple to the secondary substrate 408. In one example the switching elements 412 may be metal oxide silicon field effect transistors (MOSFETs), insulated-gate bipolar transistors, or the like. The first side 410 may also include a secondary controller 414 electrically coupled to the secondary substrate 408. The secondary controller may be configured to be a slave controller that receives instructions from the primary controller 406. Thus, in one example, in a multi-converter arrangement, if the primary controller 406 detects a fault in a first converter, the primary controller 406 may provide a communication to the secondary controller 414 to increase an output electrical excitation of a second converter to compensate for the loss in operation of the first converter.

Figure 5B:
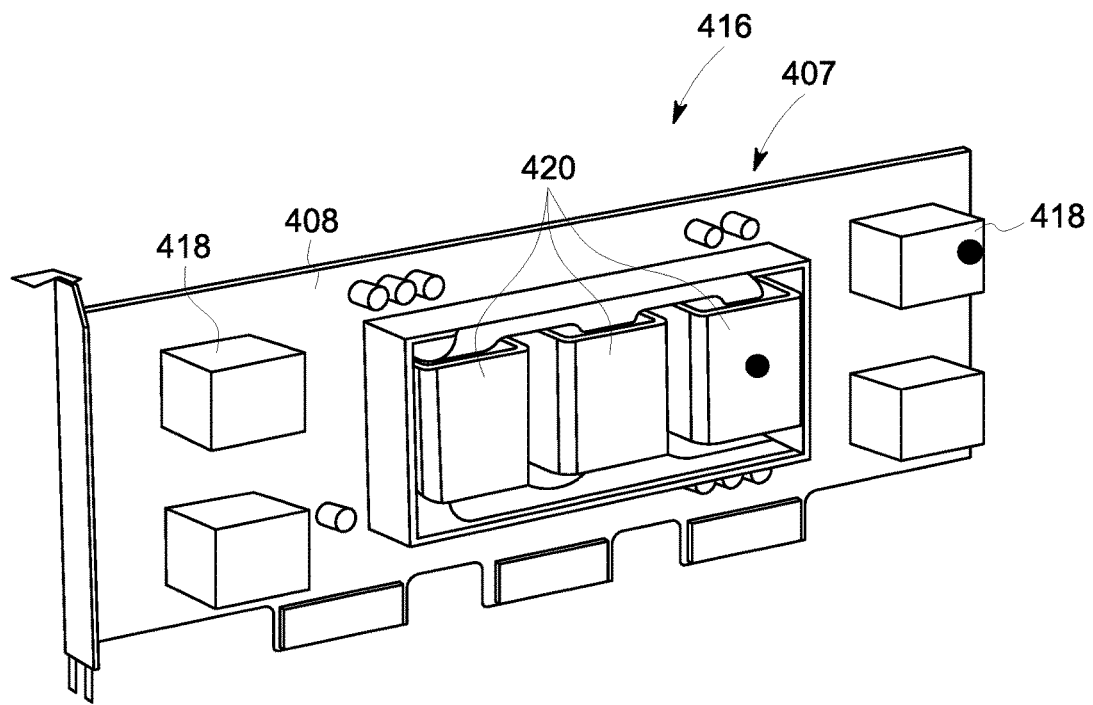
FIG. 5B is a perspective view of a back side of a converter in accordance with one embodiment.
Figure 6A:
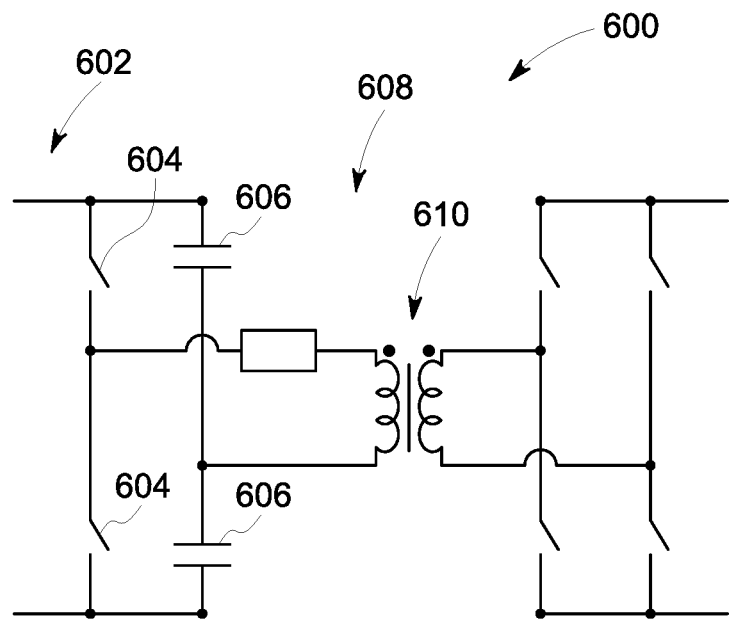
FIG. 6A is a schematic view of a portion of a converter in accordance with one embodiment.

Each secondary substrate 408 may also include a second side 416 as illustrated in FIG. 5B. On the second side 416, the conversion circuitry 407 may include plural capacitors 418a are electrically coupled to the converter substrate to receive an input. In particular, each capacitor may be electrically coupled to at least one switching element 412 at the input of the secondary substrate 408 to condition or convert input current into each converter assembly 402. The conversion circuitry may include a second plural capacitor 418b configured to eliminate all or some of the voltage and current ripple that may be caused by the switching action of elements 412. The element 418b is coupled to both the winding of the motor and the switching elements at the output of the conversion circuitry 407. The second side may also include plural transformers 420 of the conversion circuitry 407 that are electrically coupled to the switching elements 412 via the secondary substrate 408. In some embodiments the capacitors 418 may be coupled to the transformer 420 via the secondary substrate 408. The circuitry of such example is illustrated in FIG. 6A FIG. 6A illustrates a simplified schematic of an input bridge 600. The input bridge 600 may be a portion of the conversion circuitry of FIG. 6A may be any one of the input bridges 304A-D described in relation to FIG. 3. The input bridge may include an input 602 with plural switches 604 provided in series to one another and in parallel to plural capacitors 606. The plural switches 604 may be is series connection with additional plural switches of other input bridges. The input 604 is received by conversion circuitry 608 such that conversion circuitry of other input bridges is in parallel with the conversion circuitry 608. The conversion circuitry may include additional switches, transistors, MOSFETs, IGBTs, capacitors, inductors, or the like. In this manner the conversion circuitry may provide hard switch, a resonant switch, etc. The conversion circuitry 608 thus may provide an input from a transformer 610.

Figure 6B:
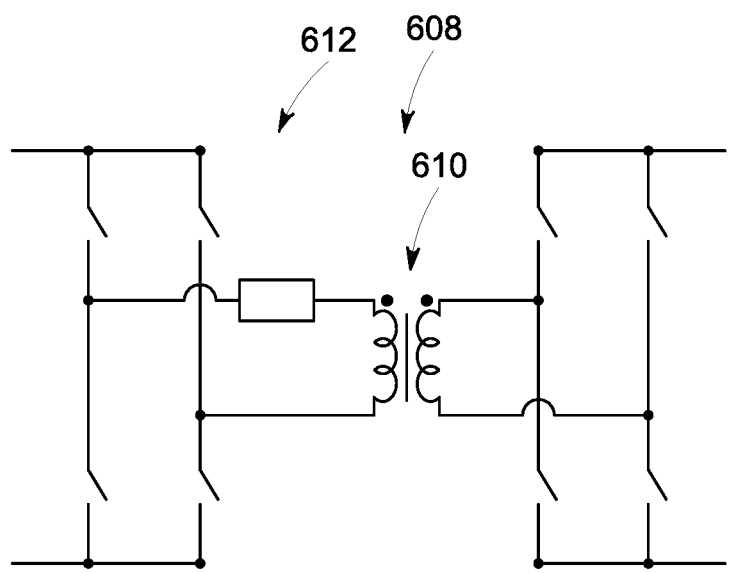
FIG. 6B is a schematic view of a portion of a converter in accordance with one embodiment.

FIG. 6B illustrates an alternative schematic of an output bridge 612. The output bridge 612 is part of the conversion circuitry 608 and may receive electrical excitation from the transformer 610. The output bridge 612 may include switches, transistors, MOSFETs, IGBTs, capacitors, inductors, or the like. In this manner the conditioning circuitry may provide hard switch, a resonant switch, etc. In this manner, the output bridge 612 may output a direct electrical excitation (DC) output, or an alternating current (AC) output.

Figure 6C:
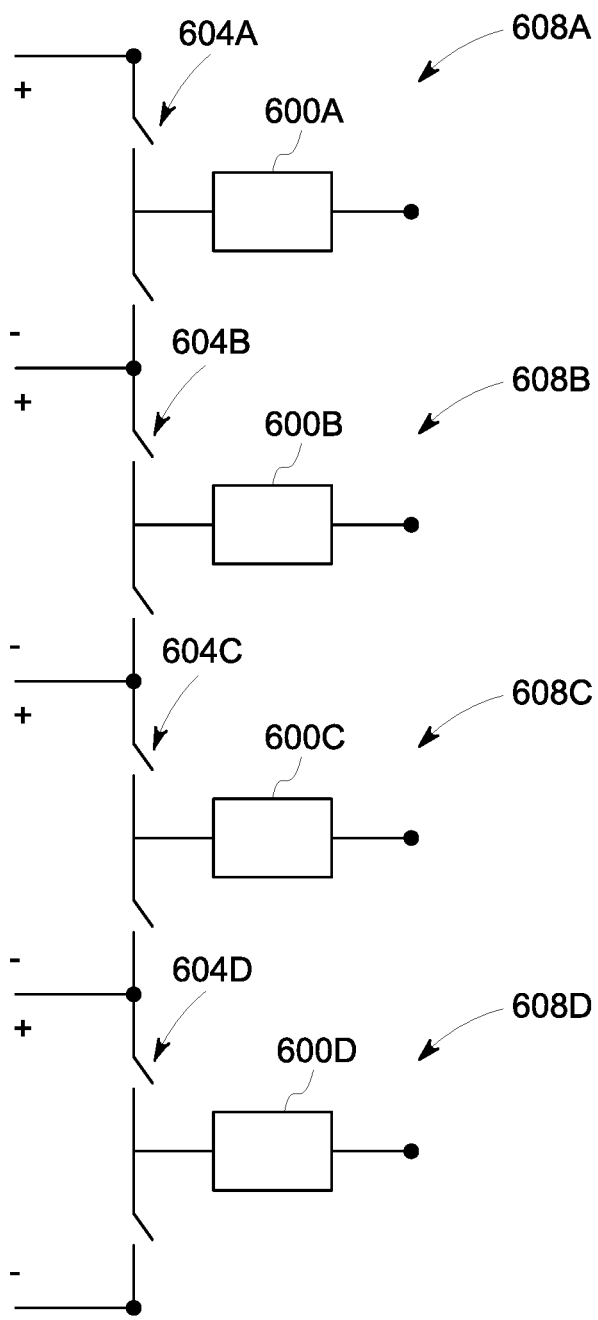
FIG. 6C is a schematic view of a portion of a converter in accordance with one embodiment.

FIG. 6C illustrates another alternative schematic of plural input bridges 600A, 600B, 600C, and 600D coupled in series. Only switches 604A-D and conversion circuitry 608A-D is illustrated to show that the input, and thus switches 604A-D are coupled in series to one another while the conversion circuitry 608A-D of each unit is coupled in parallel to each other. This coupling allows for each conversion circuitry to form a portion of an output waveform that each may be offset from one another to greatly reduce ripple voltage, and THD. Consequently, the amount of insulation required for the integrated drive may be greatly reduced, saving on cost and improving spatial consideration of the integrated drive.

Figure 7:
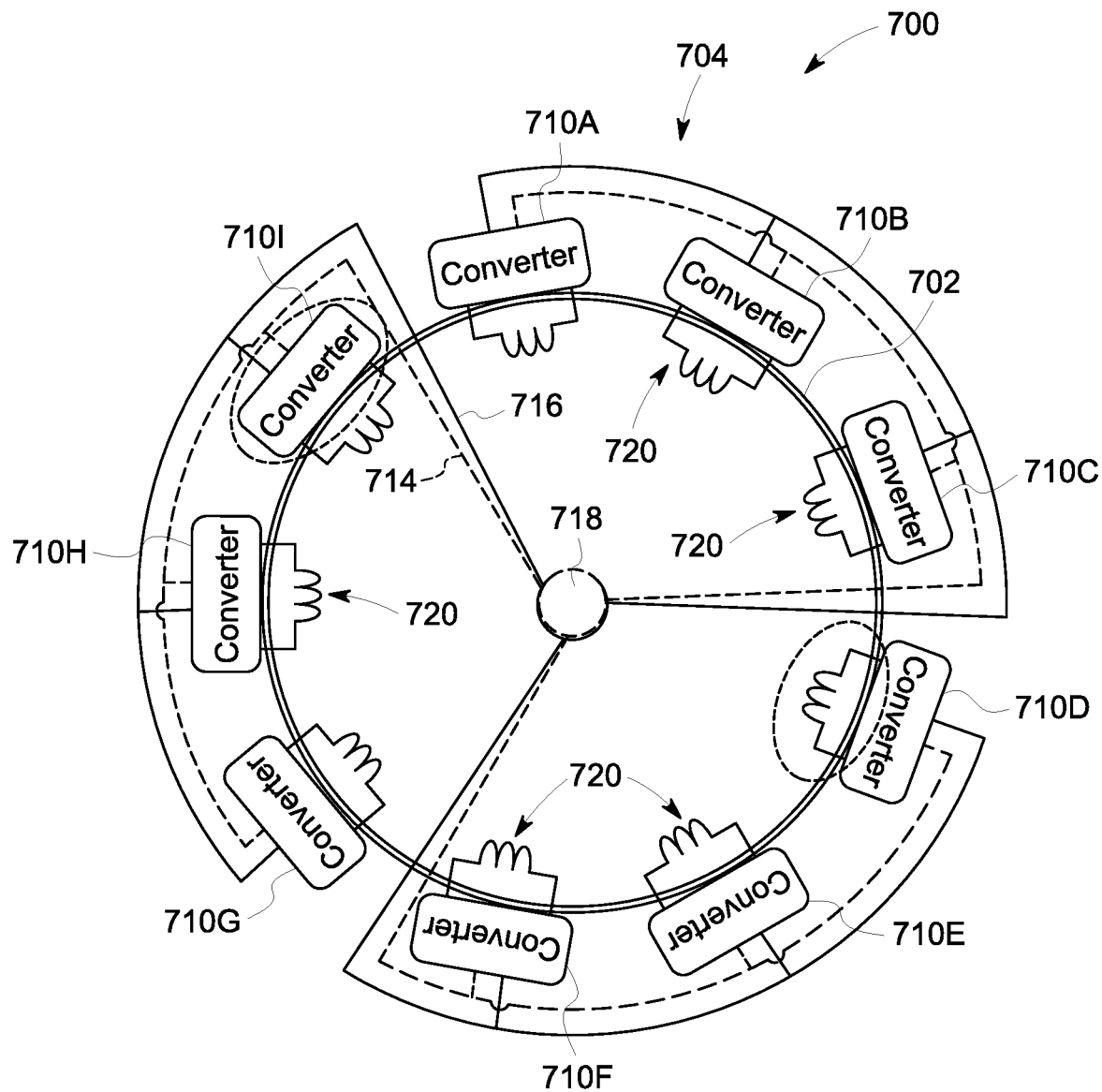
FIG. 7 is a schematic view of an electric motor/generator assembly in accordance with one embodiment.

FIG. 7 illustrates an example schematic of an electric motor/generator assembly 700 that includes a motor 702 that includes an integrated motor drive 704. FIG. 7 is similar to that illustrated in FIG. 2, with mechanical structures removed. The integrated motor drive in one example may include conversion circuitry as discussed in relation to FIG. 3. The integrated motor drive 704 may include plural converters 710A-I that surround the periphery of the motor/generator (not shown). The plural converters may each include conversion circuitry as described in relation to FIG. 4. The plural converters 710A-I each receive a positive input 714 and the negative input 716 from the motor via a centrally located coaxial cable 718 disposed therethrough. The positive input 714 and negative input 716 provide a potential difference, or voltage on each converter 710. Based on the circuitry within each converter, each converter may provide an output voltage used to drive the electric motor/generator.

In the example embodiment of FIG. 7, nine individual converters 710A-I are illustrated, with each of the converters 710A-I including a portion of a winding assembly 720 (FIG. 8) of a motor (not shown). Each winding assembly 720 may include positive and negative terminal sets that receive the positive input 714 and negative input 716 to provide a potential across the winding assembly 720.

The nine individual converters 710A-I may each provide a voltage output that may be used to drive a motor. Because nine separate converters 710A-I are provided, each may contribute an equal amount of the electrical excitation input received by the winding assembly 720. Because of the redundancy of the converters 710A-I, if one converter malfunctions, the others may continue providing the electrical excitation input for the motor. To this end, a controller may be provided that determines the malfunction in one converter, and increases the electrical excitation output of one or more of the other converters to compensate for the lose of the malfunctioning converter. Additionally, an additional redundancy may be provided in that the converts of FIG. 7 may be grouped into systems of three with each system of three converters providing a determined phase input for the motor. In this manner, if motor circuitry is damaged, or malfunctions, each phase may still be controlled by controlling the converter circuitries to compensate for the damaged or malfunctioning motor circuitry. Specifically, the integrated motor drive can also be operated in reduced capability when a failure happens to provide limp-home capability.

Figure 8:
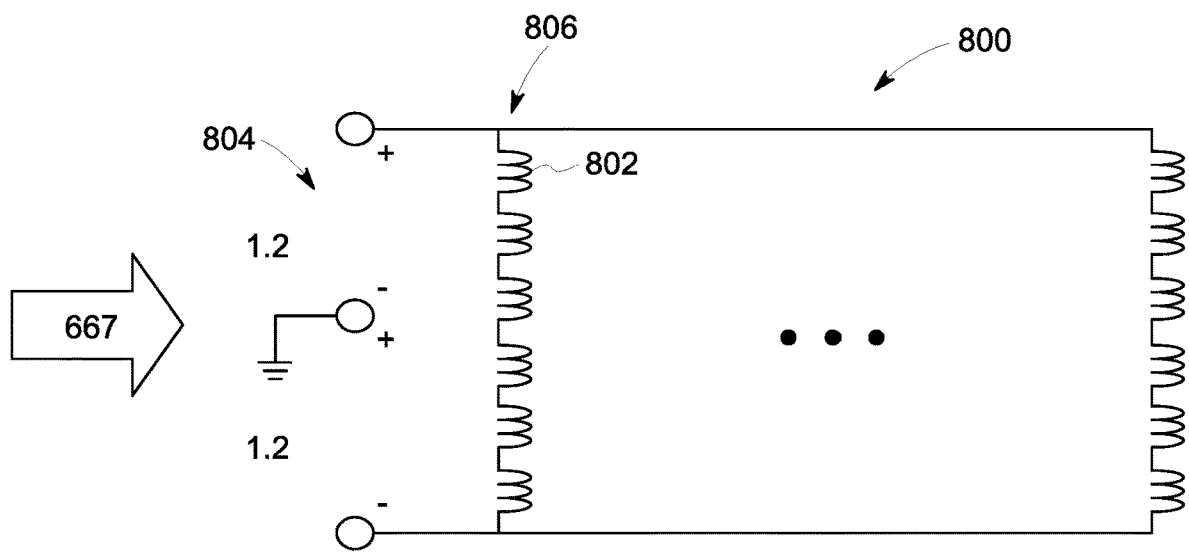
FIG. 8 is a schematic view of a winding assembly in accordance with one embodiment.

FIG. 8 illustrates an example winding assembly 800. In one example, the winding assembly 800 of FIG. 8 is the winding assembly 720 of FIG. 7. The winding assembly 800 includes a determined number of poles 802 per a negative and positive terminal set 804. In one example, a winding assembly may only have one pole per terminal set, while in other examples a set of six poles in series per terminal set may be provided. Each such set of poles form a circuit 806, where plural circuits 806 may be connected in parallel to one another. Then depending on a desired output, the number of poles or phases and terminals may be varied. In one example, the number of poles 802 in series in a circuit 806 may be six with one terminal set 804 where sixteen such circuits 806 in parallel are provided to receive an input of 667 kW at the terminal set 804. While 667 kW is provided for this example, the value of the kW is not relevant and could be higher or lower, depending on the desired maximum motor power. The concept in this application can be applied to high power or low power: there are no intrinsic limits). This example is illustrated in FIG. 8. Alternatively, the number of poles 802 in series in a circuit 806 may be two with three terminal sets 804 where sixteen such circuits 806 in parallel are provided to receive an input of 223 kW at each terminal set 804. Thus, by varying the terminal sets 804 and poles 802 different input powers may be accommodated. Specifically, given a total power to be delivered at the shaft, the total power can be split in more or less sub-power sets so that the circuitries can be designed to handle more (or less) power each. Each problem might have a different optimal solution, but the approach in this application will be the same.

Figure 9:
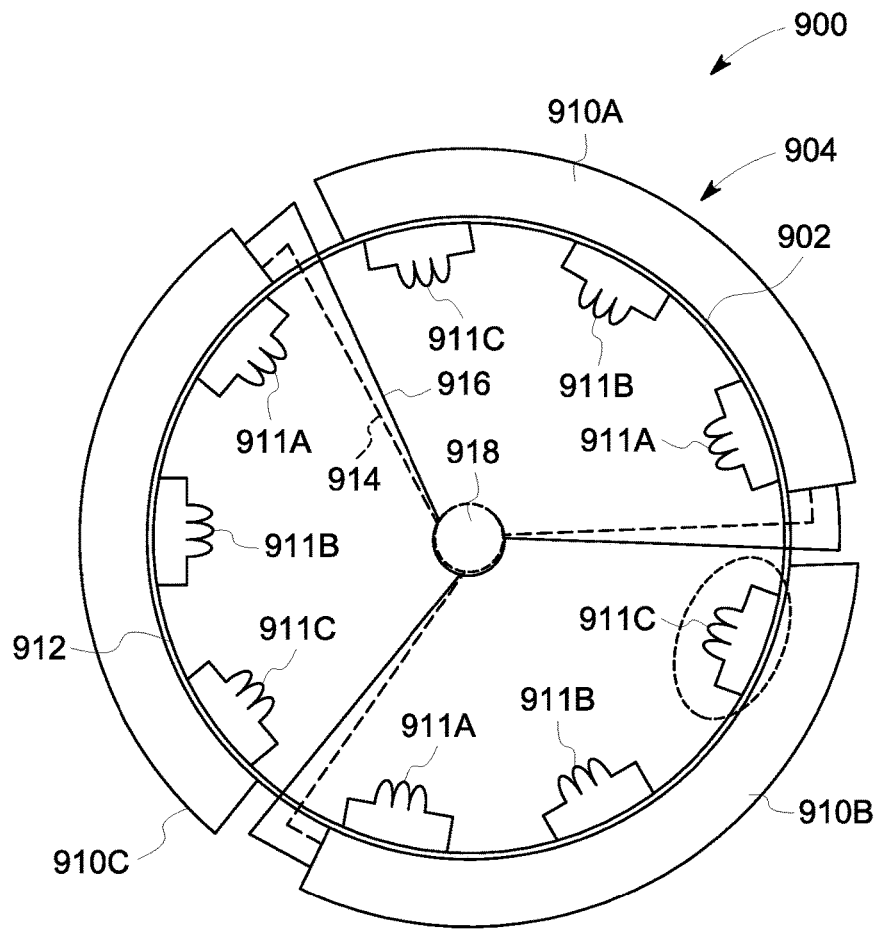
FIG. 9 is a schematic view of an electric motor/generator assembly in accordance with one embodiment.

FIG. 9 illustrates another example schematic of an electric motor/generator assembly 900 similar to that illustrated in Figured 2 and 7. In particular, the electric motor/generator assembly 900 includes a motor/generator 902 that includes an integrated motor drive 904. The integrated motor drive 904 may include a first converter 910A, second converter 910B, and third converter 910C that surround the periphery 912 of the motor 902. In one example, each converter 910A-C may be formed consistent with the example converters of FIGS. 3-6C. In particular, the first converter 910A may include first conversion circuitry, second conversion circuitry, and third conversion circuitry, each associated with a different winding 911A, 911B, and 911C of a winding assembly where each winding 911A, 911B, and 911C belong to a different phase; for example phase 1, phase 2, and phase 3 of the motor. In the example of FIG. 9, by having three converters with three windings to provide the different phases, ripple current is significantly reduced, if not eliminated as compared to the embodiment of FIGS. 2 and 7. However, with only three total converters, the amount of redundancy compared to the embodiments of FIGS. 2 and 7. As a result, while the embodiment of FIG. 9 includes some redundancy advantages, the embodiment of FIG. 9 does not have the redundancy advantages as realized by the embodiments of FIGS. 2 and 7.

To this end, converters 910A, 910B, or 910C may receive a positive input 914 and the negative input 916 from a centrally located cable 918 disposed therethrough. The positive input 914 and negative input 916 provide a potential difference, or voltage on each converter 910. The input electrical excitation is then supplied to each of the first conversion circuitry, second conversion circuitry, and third conversion circuitry to provide an output electrical excitation waveform for each winding 911A-C respectfully. Each electrical excitation waveform output may include a phase that is off-set from the phase of an electrical excitation waveform formed by a different conversion circuitry. By offsetting the phases, when the electrical excitation waveforms are combined and summed to form a first summation waveform, ripple voltage is cancelled and THD is reduced. Therefore, each converter 910A, 910B, and 910C, may include first, second, and third conversion circuitry to provide a first summation waveform, second summation waveform, and third summation waveform respectfully. By reducing the voltage slew rate, excess insulation is unneeded. While only three converters 910A-C are provided as compared to the nine converters of FIGS. 2 and 7, reducing redundancy of the integrated drive, the tradeoff is the reduced THD and ripple current that may be desired for a vehicle such a in aircraft. In addition, even if one converter 910A, 910B, or 910C fails, to other convertors are still available to compensate for the fault to continue to drive the motor. In general, the dv/dt is one major determining factor for insulation requirements, while lower THD is desired because it means lower torque ripple and losses. It affects insulation time in terms of impact of loss to temperature of windings.

Figure 10:
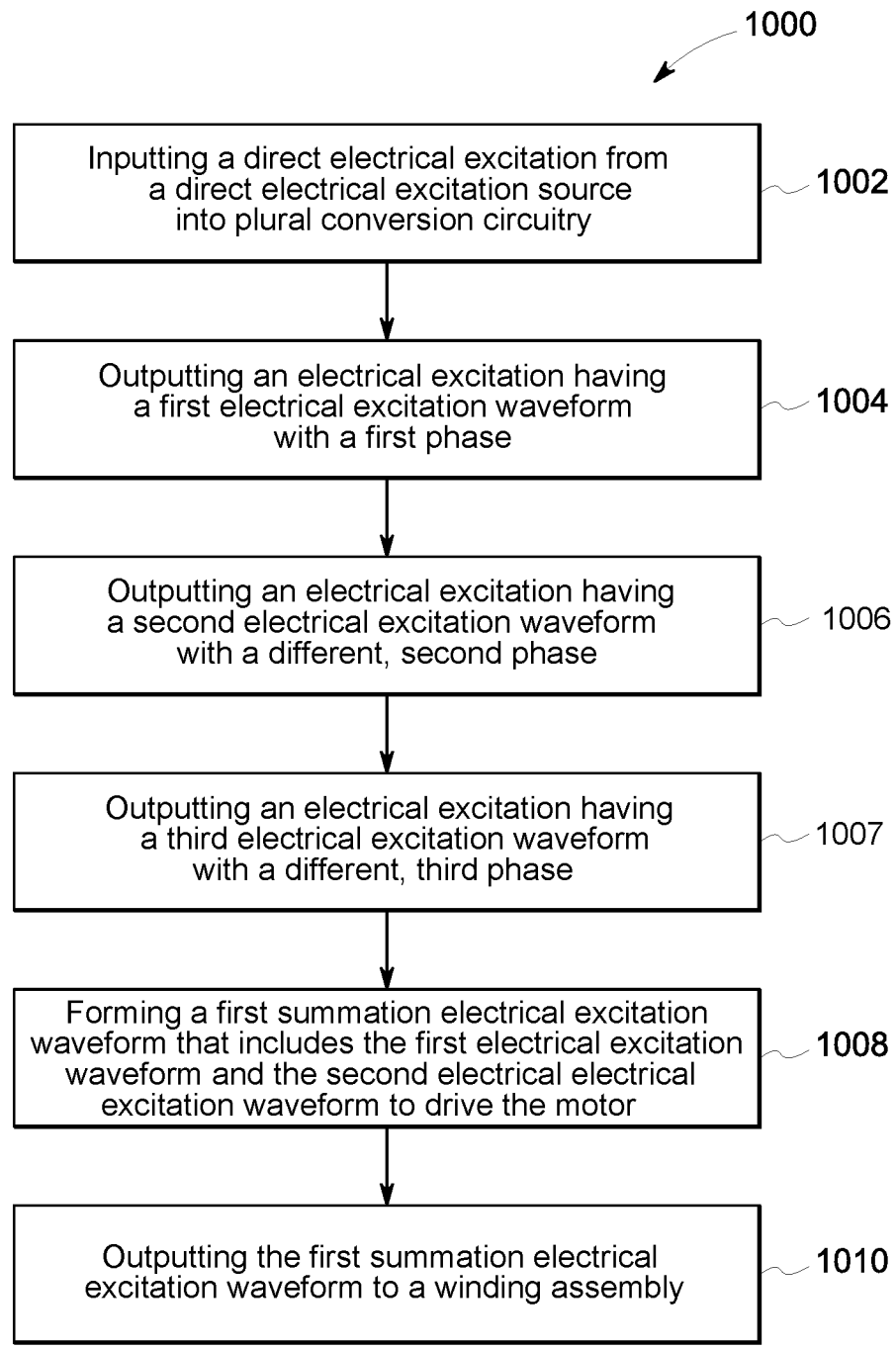
FIG. 10 is a flow block diagram of a method of driving an electric motor in accordance with one embodiment.

FIG. 10 illustrates a method 1000 for driving an electric motor. In one example, the integrated motor drive used to perform the method is the integrated motor drive 904 of FIG. 9. While any vehicle may use the method 1000, in one example the method may be used for an aircraft.

At 1002, a direct electrical excitation signal such as a current or voltage may be input from a direct electrical excitation signal source into plural conversion circuitry. In one example a direct electrical excitation signal source may be coupled in series to a first conversion circuitry, second conversion circuitry, and third conversion circuitry of the same converter. In other examples, only a first conversion circuitry and second conversion circuitry of a converter may be provided. In another example, more than three conversion circuitries in a converter may be provided. The conversion circuitry may be of a first converter, second converter, third converter, N converter, etc. In one example, the conversion circuitry is the conversion circuitry described in relation to FIGS. 4-6C.

At 1004, an electric current having a first electrical excitation waveform with a first phase is outputted by first conversion circuitry. The first conversion circuitry may include a first decoupling capacitor set, an input bridge, a transformer, and/or an output bridge, and a second capacitor set to condition the direct electrical excitation input to provide an output for supplying to a winding of a winding assembly of a motor. The first electrical excitation waveform may include a DC waveform or an AC waveform. The first conversion circuitry may be the first conversion circuitry of a first converter, second converter, third converter, etc. To this end, electric current having a first electrical excitation waveform may be outputted from a first converter at the same time electric current having a first electrical excitation waveform is being outputted from a second converter. Optionally, as the electric current having the first electrical excitation waveform with the first phase is outputted by the first conversion circuitry of a first converter, an electric current having a first electrical excitation waveform with a first phase may be independently outputted by first conversion circuitry of a second converter.

Additional converters my operate in a similar manner as desired. In one example five converters may be provided, while in other examples nine converters, or N-converters may be provided as desired. By having additional, independent converters, redundancy is provided for an integrated drive. For example, redundancy may be provided in that if one converter of N-converters fails, N−1 converters are still provided and may be controlled to compensate for the faulty converter. Alternatively, an individual converter, or a set of converters may provide phase input for the motor such that if circuitry within the motor fails, adjustments may be made related to the sets of converters to address the failure of the motor circuitry. In all, depending on the amount of redundancy and control of the total input power into the motor, the number of converters and sets of converters may be selected as needed or desired.

At 1006, an electric current having a second electrical excitation waveform with a different, second phase is outputted with the second conversion circuitry. The second conversion circuitry may include a first decoupling capacitor set, an input bridge, a transformer, and/or an output bridge, and a second capacitor set to condition the direct electrical excitation input to provide an output for supplying to a winding of a winding assembly of a motor. The second electrical excitation waveform may include a DC waveform or an AC waveform. The second conversion circuitry may be the second conversion circuitry of a first converter, second converter, third converter, etc. To this end, electric current having a second electrical excitation waveform may be outputted from a first converter at the same time electric current having a second electrical excitation waveform is being outputted from a second converter. Optionally, while the electric current having a second electrical excitation waveform with a different, second phase is outputted with the second conversion circuitry of the first converter, an electric current having a second electrical excitation waveform with a different, second phase may be independently outputted with second conversion circuitry of a second converter. By having additional independent converters, redundancy is provided for an integrated drive. Similarly, optionally, additional converters may be added with similar functionality.

At 1007, an electric current having a third voltage waveform with a different, third phase is outputted with the third conversion circuitry. The third conversion circuitry may include a first decoupling capacitor set, an input bridge, a transformer, and/or an output bridge, and a second capacitor set to condition the direct electrical excitation input to provide an output for supplying to a winding of a winding assembly of a motor. The third voltage waveform may include a DC waveform or an AC waveform. The third conversion circuitry may be the third conversion circuitry of a first converter, second converter, third converter, etc. To this end, electric current having a third voltage waveform may be outputted from a first converter at the same time electric current having a second electrical excitation waveform is being outputted from a second converter. Optionally, while the electric current having a third voltage waveform with a different, third phase is outputted with the third conversion circuitry of the first converter, an electric current having a third voltage waveform with a different, third phase may be independently outputted with second conversion circuitry of a second converter. By having additional independent converters, redundancy is provided for an integrated drive. While in this method only three converters are discussed, as described above, N converters, phases, redundancies, etc. may be used depending on the desired control over the total power input into the motor.

At 1008, a first summation electrical excitation waveform is formed that includes the first electrical excitation waveform and the second electrical excitation waveform to drive the motor. In one example, the first phase of the first electrical excitation waveform is offset from the second phase of the second electrical excitation waveform. In this manner ripple voltage cancels out reducing ripple current in the summation waveform and also reducing THD. In one example, a transformer combines the first electrical excitation waveform and the second electrical excitation waveform. Optionally, while the first summation electrical excitation waveform is being formed, a second summation electrical excitation waveform may be independently formed that includes a first electrical excitation waveform and second electrical excitation waveform of a second converter. By having additional independent converters, redundancy is provided for an integrated drive. Similarly, optionally, additional converters may be added with similar functionality.

At 1010, the first summation electrical excitation waveform is outputted to a winding assembly of an electric motor. In one example, the winding assembly independently receives plural summation electrical excitation waveforms from different converters. In this manner, redundancy is provided for the integrated drive.

Thus provided, is an integrated motor drive that provide for a smooth waveform with reduced ripple voltage. The reduced ripple voltage results in reduced insultation materials, size, cost, and the like. The reduced ripple also results in reduced EMI, low THD, and with continuously adjustable frequency and amplitude that allows for accurate and fast torque and speed control. This integrated motor drive solution absorbs also an input current with reduced ripple, thus drastically reducing EMI and THD on the input side as well. Additionally, the integrated motor drive provides fault redundancy such that as if a converter malfunctions during operation, at least one additional converter is available to drive an electric motor. This is especially useful for vehicles such as aircraft that need to be able to power a motor even when malfunction of a portion of the motor drive occurs. This allows the faulty portion to be easily identified, an facilitates maintenance accordingly. Additionally, because of the modularity of the integrated drive, including a series coupling allows the use of converters with lower voltage or current capability than provided by a transmission line or by the power required by the final load. Additionally, the converters are readily available, and may be coupled in parallel to provide additional power and fault redundancy.

In one or more embodiments, a system may be provided that may include an integrated motor drive configured to couple to a motor. The integrated motor drive may include a first converter that may be configured to electrically couple with a winding assembly of the motor. The first converter may include at least first conversion circuitry configured to form a first electrical excitation waveform and second conversion circuitry coupled in parallel to the second conversion circuitry and configured to form a second electrical excitation waveform. The first converter may also include a first transformer configured to form a first summation electrical excitation waveform from the first electrical excitation waveform and the second electrical excitation waveform that drives the motor.

Optionally, a second converter may be configured to electrically couple with the winding assembly of the motor. The second converter may include at least first conversion circuitry that may be configured to form a first electrical excitation waveform of the second converter and second conversion circuitry coupled in parallel to the second conversion circuitry and configured to form a second electrical excitation waveform of the second converter. The second converter may also include a second transformer that may be configured to form a second summation electrical excitation waveform from the first electrical excitation waveform of the second converter and the second electrical excitation waveform of the second converter.

Optionally, the second converter may be configured to form the second summation electrical excitation waveform independently from the first summation electrical excitation waveform.

Optionally, the first conversion circuitry may be configured to offset a phase of the first electrical excitation waveform compared to a phase of the second electrical excitation waveform.

Optionally, the first conversion circuitry may include a first input circuitry, and a first output circuitry electrically coupled to the first transformer.

Optionally, the integrated motor drive may be coupled to a non-drive end of the motor.

Optionally, the winding assembly may include a negative terminal, a positive terminal, and at least one pole coupled to the negative terminal and positive terminal.

Optionally, the at least one pole may include two poles coupled in series.

In one or more embodiments, a system may be provided that may include an integrated motor drive configured to couple to a motor. The motor drive may include a first converter that may be configured to electrically couple with a winding assembly of the motor. The first converter may include at least conversion circuitry that may be configured to form a first electrical excitation waveform to drive the motor, and may also include a second converter configured to electrically couple with the winding assembly of the motor. The second converter may include at least conversion circuitry of the second converter configured to form a second electrical excitation waveform to drive the motor independently of the first converter.

Optionally, the integrated motor drive may include a third converter that may be configured to electrically couple with the winding assembly of the motor. The third converter may include at least conversion circuitry of the third converter configured to form a third voltage waveform to drive the motor independently of the first converter and the second converter.

Optionally, the conversion circuitry of the first converter may include a first input circuitry, a first transformer coupled to the first input circuitry, and a first output circuitry coupled to the first transformer.

Optionally, the conversion circuitry of the first converter may include a second input circuitry, a second transformer coupled to the second input circuitry, and a second output circuitry coupled to the second transformer. The second input circuitry may be coupled in parallel with the first input circuitry.

Optionally, the integrated motor drive may be coupled to a non-drive end of the motor.

Optionally, the winding assembly may include a negative terminal, a positive terminal, and at least one pole coupled to the negative terminal and positive terminal.

Optionally, the at least one pole may include two poles coupled in series.

In one or more embodiments, method may be provided that may include inputting a direct electrical excitation input from a direct electrical excitation source into first conversion circuitry of a first converter. The first conversion circuitry may be electrically coupled in series with the direct electrical excitation source. The method may also include inputting the direct electrical excitation input from the direct electrical excitation source into second conversion circuitry of the first converter. The first conversion circuitry may be electrically coupled in series with the direct electrical excitation source. The method may also include outputting an electric current that may have a first electrical excitation waveform with a first phase with the first conversion circuitry. The method may also include outputting an electric current that may have a second electrical excitation waveform with a different, second phase with the second conversion circuitry. The method may also include forming a first summation electrical excitation waveform that may include the first electrical excitation waveform and the second electrical excitation waveform to drive the motor.

Optionally, the method may also include off-setting the first phase of the first electrical excitation waveform from the second phase of the second electrical excitation waveform to reduce a ripple voltage in the summation electrical excitation waveform.

Optionally, the method may also include inputting the direct electrical excitation input from the direct electrical excitation source into first conversion circuitry of a second converter. The first conversion circuitry of the second converter may be electrically coupled in series with the direct electrical excitation source. The method may also include inputting the direct electrical excitation input from the direct electrical excitation source into second conversion circuitry of the second converter, the first conversion circuitry electrically coupled in series with the direct electrical excitation source, and outputting an electric current having a first electrical excitation waveform with a first phase with the first conversion circuitry of the second converter. The method may also include outputting an electric current having a second electrical excitation waveform with a different, second phase with the second conversion circuitry of the second converter, and forming a second summation electrical excitation waveform that includes the first electrical excitation waveform of the second converter and the second electrical excitation waveform of the second converter to drive the motor.

Optionally, the method may also include independently outputting the first electrical excitation waveform and the second electrical excitation waveform.

Optionally, the method may also include outputting the first summation electrical excitation waveform to a winding assembly of an electric motor.

As used herein, an element or step recited in the singular and proceeded with the word "a" or "an" should be understood as not excluding plural of said elements or steps, unless such exclusion is explicitly stated. Furthermore, references to "one embodiment" of the presently described subject matter are not intended to be interpreted as excluding the existence of additional embodiments that also incorporate the recited features. Moreover, unless explicitly stated to the contrary, embodiments "comprising" or "having" an element or a plurality of elements having a particular property may include additional such elements not having that property.

The above description is illustrative and not restrictive. For example, the above-described embodiments (and/or aspects thereof) may be used in combination with each other. In addition, many modifications may be made to adapt a particular situation or material to the teachings of the subject matter set forth herein without departing from its scope. While the dimensions and types of materials described herein are intended to define the parameters of the disclosed subject matter, they are by no means limiting and are example embodiments. Many other embodiments will be apparent to those of ordinary skill in the art upon reviewing the above description. The scope of the subject matter described herein should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects. Further, the limitations of the following claims are not written in means-plus-function format and are not intended to be interpreted based on 35 U.S.C. § 112(f), unless and until such claim limitations expressly use the phrase "means for" followed by a statement of function void of further structure.

This written description uses examples to disclose several embodiments of the subject matter set forth herein, including the best mode, and also to enable a person of ordinary skill in the art to practice the embodiments of disclosed subject matter, including making and using the devices or systems and performing the methods. The patentable scope of the subject matter described herein is defined by the claims, and may include other examples that occur to those of ordinary skill in the art. Such other examples are intended to be within the scope of the claims if they have structural elements that do not differ from the literal language of the claims, or if they include equivalent structural elements with insubstantial differences from the literal languages of the claims.

What is claimed is:

1. A system comprising:
an integrated motor drive configured to couple to a motor comprising:
a first converter configured to electrically couple with a winding assembly of the motor, the first converter comprising:
at least first conversion circuitry configured to form a first electrical excitation waveform and second conversion circuitry coupled in parallel to the first conversion circuitry and configured to form a second electrical excitation waveform; and
a first transformer configured to form a first summation electrical excitation waveform from the first electrical excitation waveform and the second electrical excitation waveform that drives the motor.

2. The system of claim 1, comprising:
a second converter configured to electrically couple with the winding assembly of the motor, the second converter comprising:
at least first conversion circuitry configured to form a first electrical excitation waveform of the second converter and second conversion circuitry coupled in parallel to the first conversion circuitry and configured to form a second electrical excitation waveform of the second converter; and
a second transformer configured to form a second summation electrical excitation waveform from the first electrical excitation waveform of the second converter and the second electrical excitation waveform of the second converter.

3. The system of claim 2, wherein the second converter is configured to form the second summation electrical excitation waveform independently from the first summation electrical excitation waveform.

4. The system of claim 1, wherein the first conversion circuitry is configured to offset a phase of the first electrical excitation waveform compared to a phase of the second electrical excitation waveform.

5. The system of claim 1, wherein the first conversion circuitry includes a first input circuitry, and a first output circuitry electrically coupled to the first transformer.

6. The system of claim 1, wherein the integrated motor drive is coupled to a non-drive end of the motor.

7. The system of claim 1, wherein the winding assembly includes a negative terminal, a positive terminal, and at least one pole coupled to the negative terminal and positive terminal.

8. The system of claim 7, wherein the at least one pole includes two poles coupled in series.

9. A system comprising:
an integrated motor drive configured to couple to a motor comprising:
a first converter configured to electrically couple with a winding assembly of the motor, the first converter comprising:
at least conversion circuitry configured to form a first electrical excitation waveform to drive the motor; and
a second converter configured to electrically couple with the winding assembly of the motor, the second converter comprising:
at least conversion circuitry of the second converter configured to form a second electrical excitation waveform to drive the motor independently of the first converter.

10. The system of claim 9, the integrated motor drive comprising a third converter configured to electrically couple with the winding assembly of the motor, the third converter comprising:
at least conversion circuitry of the third converter configured to form a third voltage waveform to drive the motor independently of the first converter and the second converter.

11. The system of claim 9, wherein the conversion circuitry of the first converter includes a first input circuitry, a first transformer coupled to the first input circuitry, and a first output circuitry coupled to the first transformer.

12. The system of claim 11, wherein the conversion circuitry of the first converter includes a second input circuitry, a second transformer coupled to the second input circuitry, and a second output circuitry coupled to the second transformer, wherein the second input circuitry is coupled in parallel with the first input circuitry.

13. The system of claim 9, wherein the integrated motor drive is coupled to a non-drive end of the motor.

14. The system of claim 9, wherein the winding assembly includes a negative terminal, a positive terminal, and at least one pole coupled to the negative terminal and positive terminal.

15. The system of claim 14, wherein the at least one pole includes two poles coupled in series.

16. A method comprising:
   inputting a direct electrical excitation input from a direct electrical excitation source into first conversion circuitry of a first converter, the first conversion circuitry electrically coupled in series with the direct electrical excitation source;
   inputting the direct electrical excitation input from the direct electrical excitation source into second conversion circuitry of the first converter, the first conversion circuitry electrically coupled in series with the direct electrical excitation source;
   outputting an electric current having a first electrical excitation waveform with a first phase with the first conversion circuitry;
   outputting an electric current having a second electrical excitation waveform with a different, second phase with the second conversion circuitry; and
   forming a first summation electrical excitation waveform that includes the first electrical excitation waveform and the second electrical excitation waveform to drive the motor.

17. The method of claim 16, comprising, off-setting the first phase of the first electrical excitation waveform from the second phase of the second electrical excitation waveform to reduce a ripple voltage in the summation electrical excitation waveform.

18. The method of claim 16, comprising
   inputting the direct electrical excitation input from the direct electrical excitation source into first conversion circuitry of a second converter, the first conversion circuitry of the second converter electrically coupled in series with the direct electrical excitation source;
   inputting the direct electrical excitation input from the direct electrical excitation source into second conversion circuitry of the second converter, the second conversion circuitry of the second converter electrically coupled in series with the direct electrical excitation source;
   outputting an electric current having a first electrical excitation waveform with a first phase with the first conversion circuitry of the second converter;
   outputting an electric current having a second electrical excitation waveform with a different, second phase with the second conversion circuitry of the second converter; and
   forming a second summation electrical excitation waveform that includes the first electrical excitation waveform of the second converter and the second electrical excitation waveform of the second converter to drive the motor.

19. The method of claim 18, comprising independently outputting the first electrical excitation waveform and the second electrical excitation waveform.

20. The method of claim 16, comprising:
   outputting the first summation electrical excitation waveform to a winding assembly of an electric motor.

* * * * *